(12) United States Patent
Riegl et al.

(10) Patent No.: US 12,546,728 B2
(45) Date of Patent: Feb. 10, 2026

(54) DEVICE AND METHOD FOR OPTICALLY CAPTURING AN OBJECT

(71) Applicant: MD ELEKTRONIK GmbH, Waldkraiburg (DE)

(72) Inventors: Christoph Riegl, Wasserburg am Inn (DE); Helmut Harrer, Waldkraiburg (DE); Robert Lemaire, Jettenbach (DE); Stefan Perzl, Schwindegg (DE); Martin Gwiasda, Toeging (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 617 days.

(21) Appl. No.: 17/828,049

(22) Filed: May 31, 2022

(65) Prior Publication Data
US 2022/0390389 A1 Dec. 8, 2022

(30) Foreign Application Priority Data
Jun. 7, 2021 (DE) ...................... 10 2021 114 526.0

(51) Int. Cl.
*G01N 21/952* (2006.01)
*G01R 31/58* (2020.01)
(Continued)

(52) U.S. Cl.
CPC ........... *G01N 21/952* (2013.01); *G01R 31/58* (2020.01); *G06T 7/90* (2017.01); *H04N 23/23* (2023.01);
(Continued)

(58) Field of Classification Search
CPC .... G01J 5/0044; G01J 5/0096; G01N 21/952; G01N 21/8806; G01N 2201/0231; G01N 2201/06173; G01N 21/3563; G01N 21/01; G01N 21/88; G01N 25/72; G01R 31/58; G06T 7/90; G06T 7/0004;
(Continued)

(56) References Cited

U.S. PATENT DOCUMENTS 3,884,075 A * 5/1975 Brandli ................. G01J 5/0022
374/129
4,316,088 A * 2/1982 Corbier ................. G01J 5/0022
374/129
(Continued)

FOREIGN PATENT DOCUMENTS

CN 205607877 U 9/2016
CN 107103598 A 8/2017
(Continued)

*Primary Examiner* — Michael P LaPage
(74) *Attorney, Agent, or Firm* — LEYDIG, VOIT & MAYER, LTD.

(57) ABSTRACT

A capturing device for optically capturing an object to be checked includes a radiation source having a wall which encompasses a recording chamber. The radiation source is configured to emit at least infrared radiation when in a heated state. The wall has at least one insertion opening for inserting the object to be checked into the recording chamber and at least one image-recording opening for recording images of the object to be checked. The capturing device also includes an image-capturing apparatus configured to record images of the object to be checked through the at least one image-recording opening.

20 Claims, 7 Drawing Sheets

(51) Int. Cl.
*G06T 7/90* (2017.01)
*H04N 23/23* (2023.01)
*G01N 21/88* (2006.01)

(52) U.S. Cl.
CPC . *G01N 21/8806* (2013.01); *G01N 2201/0231* (2013.01); *G01N 2201/06173* (2013.01)

(58) Field of Classification Search
CPC ............ G06T 2207/10052; H04N 5/33; H04N 23/23; G01B 11/24; G01B 11/30
See application file for complete search history.

(56) References Cited

U.S. PATENT DOCUMENTS

| | | | | |
|---|---|---|---|---|
| 4,919,542 A | * | 4/1990 | Nulman | G01J 5/04 374/126 |
| 5,246,292 A | * | 9/1993 | Gal | G01J 5/064 374/129 |
| 5,271,084 A | * | 12/1993 | Vandenabeele | G01J 5/0802 374/161 |
| 6,122,045 A | * | 9/2000 | Pike | G01B 11/105 348/125 |
| 6,516,083 B1 | * | 2/2003 | Bonechi | G01N 21/8914 382/141 |
| 8,483,991 B2 | * | 7/2013 | Gaertner | G01J 5/0275 702/135 |
| 2002/0079452 A1 | * | 6/2002 | Roney, Jr. | G01N 21/952 250/341.6 |
| 2003/0193987 A1 | * | 10/2003 | Zalameda | G01J 5/0805 374/7 |
| 2004/0130627 A1 | | 7/2004 | Braune | |
| 2005/0253160 A1 | * | 11/2005 | Strikovski | H05B 3/0047 372/34 |
| 2008/0063426 A1 | * | 3/2008 | Chang | G01N 21/952 399/98 |
| 2010/0309307 A1 | * | 12/2010 | Jin | G01N 21/952 382/141 |
| 2015/0316417 A1 | * | 11/2015 | Sikora | G01J 5/0096 374/121 |

FOREIGN PATENT DOCUMENTS

| | | | | |
|---|---|---|---|---|
| CN | 108195842 A | | 6/2018 | |
| CN | 111758024 A | | 10/2020 | |
| DE | 202004004402 | * | 12/2004 | ............... G01J 5/00 |
| EP | 1401193 A2 | | 3/2004 | |
| JP | H082562 Y2 | | 1/1996 | |
| WO | WO-9212405 A1 | * | 7/1992 | ............ G01J 5/0801 |

\* cited by examiner

DEVICE AND METHOD FOR OPTICALLY CAPTURING AN OBJECT

CROSS REFERENCE TO RELATED APPLICATION

This application claims benefit to German Patent Application No. DE 10 2021 114 526.0, filed on Jun. 7, 2021, which is hereby incorporated by reference herein.

FIELD

The present invention relates to a capturing device for optically capturing an object to be checked, and to a corresponding method.

The present invention is described predominantly in relation to automatic checks on cable ends. However, embodiments of the present invention may also be used to check other objects.

BACKGROUND

Nowadays, electric cables are used in a multiplicity of applications. The cables are usually preassembled at the production stage, i.e., cut to the corresponding length and fitted with plugs. Once preassembled, the cables are easy to install in the application.

When preassembling cables of this kind, it has to be ensured that the electrical contacts are connected cleanly to the relevant conductor and that no foreign matter, e.g., remnants of a cable shield, can cause a short-circuit.

SUMMARY

In an embodiment, the present invention provides a capturing device for optically capturing an object to be checked. The capturing device includes a radiation source having a wall which encompasses a recording chamber. The radiation source is configured to emit at least infrared radiation when in a heated state. The wall has at least one insertion opening for inserting the object to be checked into the recording chamber and at least one image-recording opening for recording images of the object to be checked. The capturing device also includes an image-capturing apparatus configured to record images of the object to be checked through the at least one image-recording opening.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention enable simple checks on cables during cable preassembly.

A capturing device according to an embodiment of the present invention for optically capturing an object to be checked, in particular a stripped cable end of a cable, comprises a radiation source having a wall which encompasses a recording chamber, the radiation source being configured to emit at least infrared radiation when in a heated state, and the wall having at least one insertion opening for inserting the object to be checked into the recording chamber and at least one image-recording opening for recording images of the object to be checked. Furthermore, the capturing device according to an embodiment of the present invention has an image-capturing apparatus configured to record images of the object to be checked through the at least one image-recording opening.

A method according to an embodiment of the present invention for optically capturing an object to be checked, in particular a stripped cable end of a cable, has the following steps: inserting the object to be checked into a heated radiation source having a wall which encompasses a recording chamber, the radiation source being configured to emit at least infrared radiation when in a heated state, the wall having at least one insertion opening for inserting the object to be checked into the recording chamber and at least one image-recording opening for recording images of the object to be checked. Moreover, the method according to an embodiment of the present invention comprises recording images of the object to be checked through the at least one image-recording opening.

In industrial cable preassembly, sheathed cables are often processed. During production, the shield material or cable shield has to be cut and shaped, in particular folded back on itself by 180°, so that electric contacts can be connected to the respective conductors.

During these processing steps, individual shield wires or the metal foil may detach, for example, and stick to the products owing to static charges. These shield wire fragments and foil remnants may subsequently lead to unpredictable short-circuits between the inner and outer conductors. A further cause of possible short-circuits is inadequate reshaping of the shield wires. A resultant protruding length of shield wire constitutes a distortion that may likewise lead to contact between the inner and outer conductor in the later processing steps.

In motor vehicles in particular, faulty cables pose a significant safety risk. For this reason, quality control is carried out during cable preassembly with a view to detecting faulty cables.

Short-circuits on deficient cables may occur transiently and accordingly cannot always be detected by the electrical check. Therefore, an optical check can also be carried out in addition to an electrical check for short-circuits. An optical check of this kind can ensure that there is no foreign matter, in particular foil remnants, shield wire fragments, or shield wire distortions, on a stripped cable end that could cause a short-circuit.

The capturing device according to an embodiment of the present invention assists this kind of optical check on a stripped cable end.

For this purpose, the capturing device provides a radiation source, in particular a metal radiation source, in which an object to be checked, in particular the stripped cable end of a cable, is illuminated with infrared radiation so that an image-capturing apparatus can record images of the object to be checked.

The radiation source has a wall which encompasses a recording chamber. To be able to insert the object to be checked into the recording chamber, an insertion opening is provided in the wall, through which opening the object to be checked can be guided. In addition, at least one image-recording opening is provided. The image-recording opening makes it possible to record images of the object to be checked, which is located in the recording chamber, from outside of the radiation source.

To ensure homogeneous illumination of the object to be checked, the radiation source may be configured as a metal object that emits infrared radiation when in a heated state. The heated body of the radiation source constitutes a so-called "gray body", the emitted infrared radiation of which is used to illuminate the object to be checked.

The radiation source emits a wide-band spectrum which, among other things, is given off, via the inner surfaces of the wall, into the recording chamber onto the object to be checked. In the process, the spectral maximum of the emitted infrared radiation is shifted by way of the temperature of the radiation source. Consequently, the spectral radiation output received by the image-capturing apparatus may thus be controlled in an open-loop or closed-loop manner. If a metal radiation source is heated to a temperature of less than approximately 250° C., then only, or at least predominantly, the infrared radiation fraction in the wavelength range>850 nm is used to capture the object to be checked.

To record images of the object to be checked, in particular a stripped cable end, an image-capturing apparatus having a sufficient depth of focus is used, which has an equally sufficient sensitivity in the appropriate infrared spectrum and the aperture angle of which is adapted to the measurement task so that the images of the object to be checked can be recorded with sufficient quality.

It goes without saying that, to record an image, the image-capturing apparatus may have a corresponding image sensor that is sufficiently sensitive in the infrared spectrum. In addition, corresponding optics may be provided. The image-capturing apparatus can, for example, have corresponding camera modules.

The image-capturing apparatus and the radiation source may be matched to one another in terms of the wavelength of the infrared radiation. In particular, for example, the temperature of the radiation source may be selected such that the maximum radiation output is emitted at a wavelength that corresponds to the wavelength of the greatest sensitivity of the image sensor.

The capturing device allows an object that is to be checked, in particular a cable end, to be irradiated homogeneously in the recording chamber, and allows images of the object that is to be checked to be recorded under almost ideal irradiation conditions.

In cables in particular, the dielectric usually has an absorption factor in the infrared spectrum that is significantly different from that of the metal conductor, the cable shield or other shielding materials, such as metal foils. In cables of this kind, therefore, the metal cable shield, in particular individual protruding wires of the cable shield or of other shielding materials, stand out clearly against the dielectric upon irradiation with infrared light.

Consequently, by using the capturing device, images can be recorded in which both loose or impermissible shield wires and foil remnants on stripped cable ends stand out clearly against the dielectric.

Since in the capturing device only the infrared radiation reflected by the cable end is used to record the image, and in particular the cable end is not penetrated by radiation, said cable end remnants in the capturing device only briefly, without the cable end heating up significantly. In particular, the dwell time of the cable end in the recording chamber of the radiation source is shorter than the time period required to reach a thermal equilibrium between the cable end and the radiation source. The dwell time may be just a few seconds and should not be excessively long, so as to prevent the temperatures of the dielectric (or of the plastics material of the sheath) of the cable and of the metal shield wire braiding from equalizing, i.e., to prevent the contrast from vanishing. Such an extremely short dwell time accommodates a requirement for a short process time.

Using the capturing device, images may be generated in which the material of the dielectric can be clearly distinguished from the materials of the shield wires or foils. Likewise, distorted shield wires can be easily detected in these images since they stand out against the background in high contrast. The radiation source produced from a single component allows for irradiation in the infrared spectrum while simultaneously requiring very little construction, maintenance, and adjustment work.

The two-dimensional emission of the radiation source prevents reflection peaks on the object to be checked. The objects to be checked are not significantly heated during the check itself, and the electrical and mechanical properties of, for example, cables are thus not adversely affected.

Further embodiments and developments will become apparent from the dependent claims and the description, with reference to the drawings.

In one embodiment, the recording chamber may have a lateral cross section that is substantially cylindrical or U-shaped along a longitudinal axis.

As a result of the cylindrical shape or U-shape, a homogeneous surface for emitting the infrared radiation is created in the longitudinal direction, leading to homogeneous irradiation of the cable end from all sides.

The ambient radiation around the cable end thus also allows for a clear visual distinction from highly transmissive or absorbent materials.

A recording chamber that is elongate, i.e., in particular cylindrical or U-shaped, in lateral cross section constitutes a substantially radially closed design. With the exception of the insertion opening and the at least one image-recording opening, the recording chamber is surrounded by the wall and thus roughly forms an ideal Lambertian surface-emitting radiator, which irradiates the cable end homogeneously from all sides or angles. Shadowing effects caused by specular reflections on the cable end or an unfavorable camera position are thus avoided.

In a further embodiment, the insertion opening may be arranged on a surface of the radiation source that is at a predefined angle, in particular a 90° angle, to the longitudinal axis.

The insertion opening is located on an end of the cylindrical or U-shaped recording chamber. The recording chamber can, for example, be formed as a cylinder that is open at one end in the longitudinal direction. Put another way, the surface normal of the surface on which the insertion opening is located may be in parallel with or at a corresponding angle to the longitudinal axis of the recording chamber.

The insertion opening is used for inserting the object to be checked, in particular the cable end. If the cable end is inserted in the longitudinal direction of the recording chamber, in particular in parallel with the longitudinal axis of the recording chamber, then the length of the recording chamber in the longitudinal direction can be used to determine which part of the cable end is illuminated.

The length of the recording chamber may thus be dimensioned such that the relevant part of the cable end is homogeneously irradiated, thereby ensuring high-quality image recording.

In embodiments, the recording chamber may also be configured to be open on both sides in the longitudinal direction. This makes it possible to capture not only the end of an object under test, in particular such as cable ends of a cable.

If the recording chamber is open on both sides along the longitudinal axis, an object to be checked may also be laid through the recording chamber, and points to be checked along the object under test can be optically captured at any location.

In a further embodiment, the at least one image-recording opening may be arranged radially on the recording chamber in the wall which encloses the recording chamber.

In other words, the at least one image-recording opening is arranged in the wall such that the image axis or image axes of the image-capturing apparatus is/are oriented into the recording chamber through the at least one image-recording opening orthogonally to the longitudinal axis.

In embodiments, the image axis or image axes may also be at a predefined angle, in particular also at different angles in the case of a plurality of image axes, to the longitudinal axis of the recording chamber. A configuration of this kind makes it possible to adapt the recording angle to different objects to be checked or to different checking tasks.

In yet another embodiment, the capturing device may comprise at least one heating element which is thermally coupled to the radiation source and configured to heat the radiation source to a predefined temperature, the heating element in particular having a thermistor.

The heating element heats the body of the radiation source, in particular a metal body, in such a way that said body emits infrared radiation in the desired spectral range. In embodiments, the heating element may have one or more thermistors. It goes without saying that the heating element may be coupled to a corresponding energy source.

In embodiments, the temperature of the radiation source may be captured, in particular by means of a temperature sensor. Alternatively, the maximum of the infrared radiation emitted by the radiation source in the spectral range may be captured, said maximum being characteristic of the temperature of the radiation source.

In embodiments, the heating element may be a contactless heating element; for example, the heating element may have an inductive heating element that inductively heats the radiation source.

The heating element allows the temperature of the radiation source to be controlled constantly, and thus allows infrared radiation to be emitted constantly for irradiating the object to be checked.

In a further embodiment, the wall may have three image-recording openings arranged in particular radially in the wall, each at an angle of 120° to one another. In one embodiment, the image-capturing apparatus may have three image recorders, which in particular are arranged at a corresponding image-recording opening of the image-recording openings, each at an angle of 120° to one another, the image axes of the image recorders each being directed into the recording chamber through the corresponding image-recording opening, in particular toward the longitudinal axis of the recording chamber.

A plurality of image-recording openings, in particular three, may be provided in the radiation source. These may in particular be distributed radially around the longitudinal axis in a uniform manner. Two of the image-recording openings and the corresponding image recorders, in particular image sensors, e.g., bolometric focal plane array (FPA) image sensors, or cameras, may thus each be arranged at an angle of 120° to one another and thus around the object to be checked.

Each image recorder generates a two-dimensional image and thus captures a 180° checking range around the object to be checked, in particular around a cable end to be checked. With just one image, it is only within the 180° range that it can be ascertained that no foreign matter, such as a distorted shield wire, is obscured by the cable itself. Arranging the image recorders at 120° means that, in conjunction with the 180° checking range of each individual image recorder, a partly overlapping detection range is created among the images recorded by adjacent image recorders.

Consequently, using three image recorders it is possible to achieve all-around 360° image acquisition and a redundant, and thus reliable, check for distorted shield wires, or reliable detection of particles, such as shield wire fragments, on the insulator or dielectric of a cable end.

It goes without saying that the depth of focus of each image recorder has to be selected to be sufficient for ensuring that the recorded images of the object to be checked have sufficient sharpness for detecting foreign matter.

As an alternative to the three image recorders, a single image recorder may be moved around the radiation source in relation to the relevant image-recording opening in order to record an image.

In one embodiment, the capturing device may have an analysis apparatus which is coupled to the image-capturing apparatus and configured to receive, from the image-capturing apparatus, in each case at least one image of an object to be checked, and to check whether the object to be checked has any foreign matter in at least one predefined region.

The image-capturing apparatus may transmit the recorded images to the analysis apparatus. In the analysis apparatus, the images may then be analyzed in order to capture foreign matter on the object to be checked.

In one embodiment, the analysis apparatus may be configured to actuate the image-capturing apparatus and to trigger the recording of images by the image-capturing apparatus. In particular, the analysis apparatus may be configured, for example, as a controller or a control computer that is coupled to the image-capturing apparatus and has a corresponding computer program which, when executed by a processor of the controller, controls the image-capturing apparatus and analyzes the captured images.

To review the images for the presence of foreign matter on the object to be checked, the analysis apparatus may study predefined image regions. The predefined image regions can, in particular, be those image regions that are intended to be free from foreign matter. In one embodiment, the analysis apparatus can assess whether any such predefined image region has homogenous brightness, i.e., has approximately the same grayscale value level or brightness over the entire surface. A significant jump in the grayscale value level or brightness indicates that there is foreign matter in the region.

In further embodiments, the analysis apparatus may carry out an object recognition before studying a predefined region, in order to capture the outlines of the object to be checked. In doing so, it becomes possible to carry out the check even if the object to be checked cannot always be positioned precisely in the same position in the recording chamber.

In one embodiment in which the image-capturing apparatus captures a plurality of images of the object to be checked from different directions, the images may be analyzed individually. Alternatively, the images may also be compiled into a kind of panoramic image and analyzed as a single image. A panoramic image of this kind shows a 360° all-around view of the object to be checked.

In a further embodiment, the analysis apparatus may have a trigger interface for receiving a trigger signal and may be configured, when it receives the trigger signal, to actuate the image-capturing apparatus to record the at least one image.

The trigger interface is used to couple the analysis apparatus to external equipment, such as a production system. By way of the trigger interface, the production system can inform the analysis apparatus that an object to be checked, in particular a cable end, is available for checking in the recording chamber.

The analysis apparatus can then actuate the image-capturing apparatus accordingly and analyze the captured images.

In embodiments, the capturing apparatus may be incorporated into an automated production sequence. In a sequence of this kind, for example, an automated sequence control system, e.g., a programmable logic controller (PLC), can control and monitor the individual sequences in the production system.

An automated sequence control system of this kind may thus also control the insertion of the object to be checked, the image capturing and storage, the image analysis, the evaluation of the object under test, and the removal of the object under test from the radiation source. To record and check the images, the automated sequence control system may be coupled to the analysis apparatus by way of the trigger interface.

In an example sequence for cable checking, the cable to be checked is moved in front of a test chamber or test box in which the radiation source is arranged. The cable is then inserted into the test box, positioned therein, and the image capturing is started after a time delay. If the image(s), and thus the checked cable, is/are deemed to be defective by the image processing program being run, the corresponding cable may be guided out of the test box and moved to the end of the entire process, where it can be withdrawn and then cut. If, however, the cable is evaluated as being OK, it is guided to the next production step for further processing.

By way of the trigger interface, the capturing device may also be used in a dynamic checking process in which no automated sequence control system is used. In this case, a trigger signal for the image acquisition can be transmitted to the image-capturing apparatus via the trigger interface. The trigger signal can, for example, be generated using a photoelectric sensor, which, when the relevant cable travels past, causes time-delayed recording of images in the image-capturing apparatus.

In yet another embodiment, the analysis apparatus may be configured to receive the at least one image from the image-capturing apparatus without the object to be checked being located in the recording chamber, and to receive the at least one image if the object to be checked is located in the recording chamber. The analysis apparatus may further be configured to compute a difference image from the received images and to check, on the basis of the difference image, whether the object to be checked has any foreign matter.

Comparing the differences between two images, where in one of the images the object to be checked is not located in the recording chamber and in the other image the object to be checked is located in the recording chamber, allows the background of the relevant image to be homogenized. The features of the object to be checked thus stand out more clearly and can be evaluated more effectively in the further analysis.

It goes without saying that when a plurality of images of the object to be checked are recorded from different directions, a corresponding difference comparison can be carried out for each of the images.

In yet another embodiment, in order to check the at least one predefined region, the analysis apparatus may be configured to add up grayscale values of the pixels for the predefined region and to detect foreign matter when the sum is outside of a predefined value range.

To check the images for foreign matter, predefined regions in which no foreign matter is permitted may be defined in the image. The analysis apparatus thus checks for the presence or absence of such foreign matter in the corresponding image regions.

As already explained above, the dielectric and the conductors of cables usually have a high contrast with respect to one another in the infrared spectrum. In one possible embodiment, therefore, the grayscale values of the individual pixels in any such region can be added up. If the cumulative grayscale value of each image region is outside of the defined value range, the object to be checked is deemed to be defective. This is the case, for example, if a shield wire is located in the region in question and thus "darkens" that region.

The drawings are merely schematic representations and serve merely to illustrate the invention. Identical or functionally equivalent elements are given the same reference signs throughout.

Figure 1:
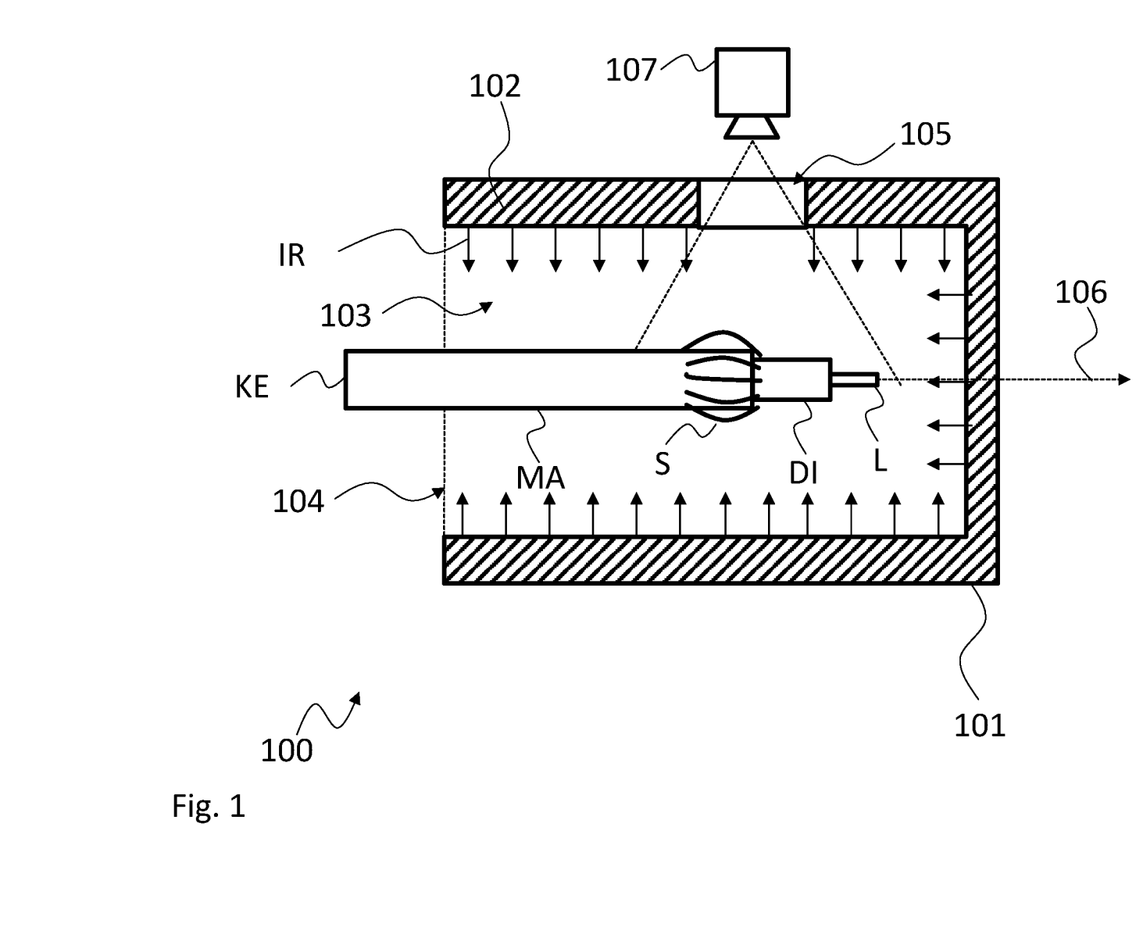
FIG. 1 is a sectional view of a schematic illustration of an embodiment of a capturing device according to the present invention.

FIG. 1 is a lateral sectional view of a capturing device 100 in which the sectional plane intersects the capturing device 100 along the longitudinal axis 106.

The capturing device 100 has a radiation source 101 in which the cable end KE to be checked is located. Furthermore, an image-capturing apparatus 107 is provided, which is used to record images of the cable end KE. The cable end KE has a sheath MA, which is enclosed, in some portions, by a folded-back cable shield of a shield wire S. Before being folded back on itself, the cable shield was laid around a dielectric DI which encompasses a conductor L. It goes without saying that this construction of the cable end KE is merely an example and other cables and cable ends may also be used with the capturing device 100.

The image-capturing apparatus 107 shown schematically is formed as a camera. It goes without saying that the image-capturing apparatus 107 may have any type of suitable image recorder. In particular, the image-capturing apparatus 107 may have one or more cameras or camera modules that record the images of the cable end KE. The image-capturing apparatus 107 may also have assistive elements such as mirrors or lenses.

The radiation source 101 is formed as a cylindrical body having a wall 102 which encloses a semi-cylinder recording chamber 103 that is closed at one end. In the longitudinal direction 106 of the radiation source 101, the recording chamber 103 is open at an insertion opening 104 toward the left-hand side in the illustration of FIG. 1.

The wall 102 consists of a material, or has a material at least on the inside, for example as a coating, that radiates infrared radiation IR when in a heated state. A material of this kind can, for example, be a metal material. To check an object, the wall 102 is heated so that the infrared radiation IR is emitted into the recording chamber 103 by the internal walls of the wall 102.

The object to be checked, in this case the cable end KE, can be inserted into the recording chamber 103 through the insertion opening 104 of the radiation source 101. As shown in FIG. 1, the cable end KE may be aligned with the longitudinal axis 106 and be positioned in the recording chamber 103 in a defined and reproducible manner. In the process, the cable end KE is at an approximately constant distance from the internal surfaces of the wall 102 in the radial direction. Homogenous illumination of the cable end KE is thus ensured.

If the cable end KE is positioned in the recording chamber 103, the image-capturing apparatus 107 can record one or more images of the cable end KE. The recorded images can then be analyzed to detect whether or not the cable end KE exhibits processing faults or foreign matter.

In the capturing device 100, the radiation source 101 has an image-recording opening 105 arranged in the radial direction, i.e., vertically over the longitudinal axis 106. The image-capturing apparatus 107 captures the images of the cable end KE from outside through the image-recording opening 105.

To be able to capture and analyze the cable end KE in its entirety, i.e., from all directions, at least in the circumferential direction of the cable end KE, the cable end KE may be rotated in the recording chamber 103, and the image-capturing apparatus 107 may record further images of the cable end KE at predefined rotational angles. Alternatively, the image-capturing apparatus 107 may record the entire rotation operation as a video recording. The video recording may then be analyzed instead of individual images.

Alternatively or additionally to rotating the cable end KE in the recording chamber, further image-recording openings may also be provided in the wall 102. For example, two opposing image-recording openings may be provided. If an image of the cable end KE is recorded through the image-recording opening 105, a 180° portion of the cable end KE can thus be recorded. Consequently, a further 180° portion of the cable end KE can be recorded through a further image-recording opening opposite the image-recording opening 105. The entire cable can thus be captured and then analyzed by means of two images recorded through opposing image-recording openings.

Figure 2:
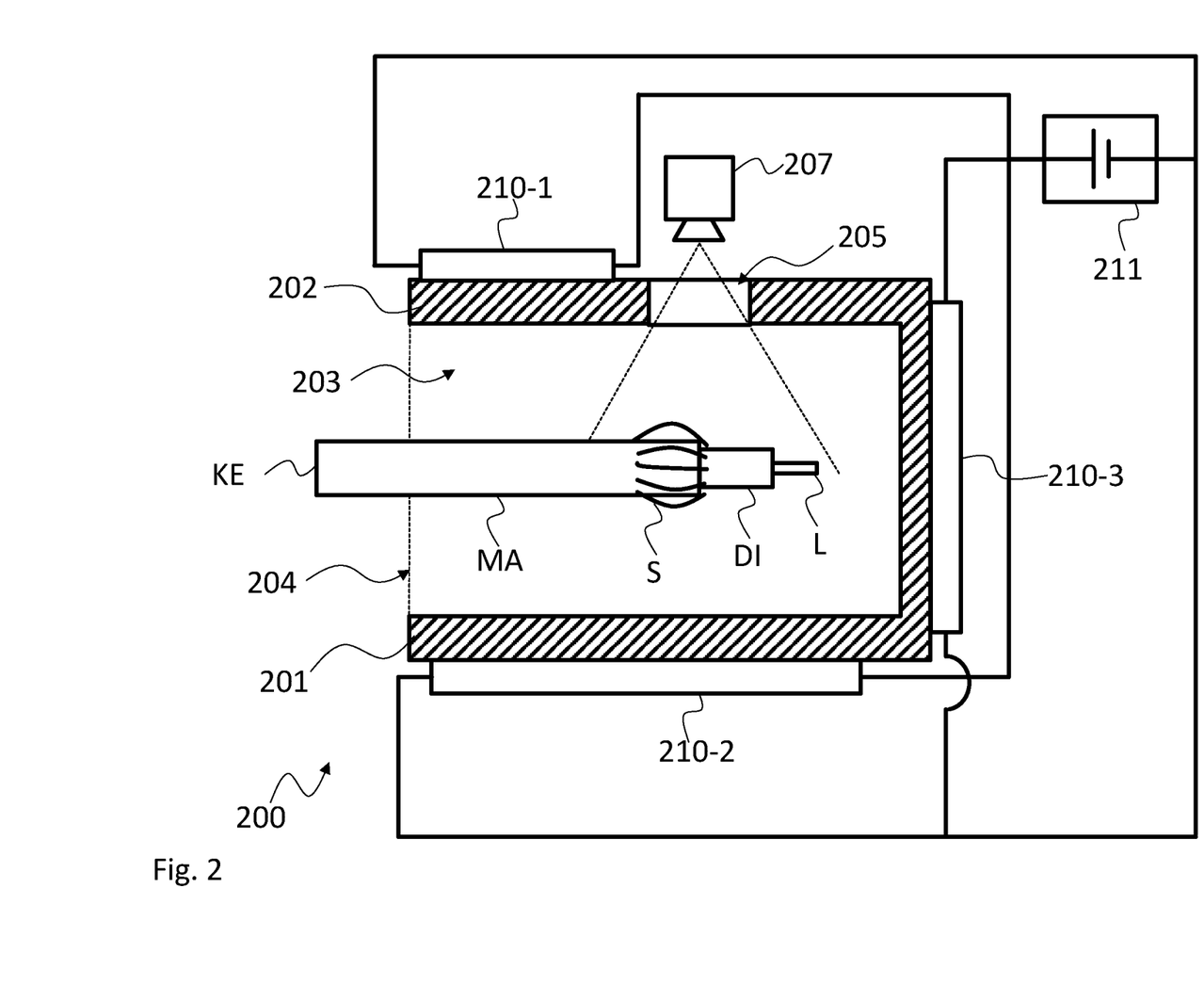
FIG. 2 is a sectional view of a schematic illustration of a further embodiment of a capturing device according to the present invention.

FIG. 2 is a sectional view of a schematic illustration of a further capturing device 200. The capturing device 200 is based on the capturing device 100, so it likewise has a radiation source 201 in which a wall 202 encloses a recording chamber 203. An insertion opening 204 and an image-recording opening 205 are provided in the wall 202, and an image-capturing apparatus 207 is arranged at the image-recording opening 205. The above explanations in relation to the capturing device 100 also apply analogously to the capturing device 200. In addition, the features discussed below in relation to the capturing device 200 may also be combined with the capturing device 100.

In accordance with an embodiment of the present invention, the capturing device 200 develops the capturing device 100 in that heating elements 210-1, 210-2, 210-3 are provided on the external surfaces of the wall 202. The heating elements 210-1, 210-2, 210-3 are supplied with electrical energy by an energy source 211 and thus heat the radiation source 201.

The heating elements 210-1, 210-2, 210-3 can be formed, for example, as heating resistors which, when fed electrical energy, heat up and transmit heat energy to the radiation source 201 so that it radiates infrared radiation IR.

To improve the energy transmission, in embodiments the heating elements 210-1, 210-2, 210-3 may be arranged in corresponding recesses (not explicitly shown) which can be made in the wall 202.

To be able to control the temperature of the radiation source 201, the capturing device 200 may have temperature sensors, the energy source 211 being able to control the energy feed to the heating elements 210-1, 210-2, 210-3 depending on the captured temperature. By way of example, so-called PTC sensors (also referred to as PTC thermistors or PTC resistors) may be used as temperature sensors. Alternatively, the temperature of the radiation source 201 may be captured by measuring the emitted infrared radiation IR.

In a further embodiment, the radiation source 201 may be heated contactlessly. For example, at least one inductive heating element that may heat the radiation source 201 can be provided.

Figure 3:
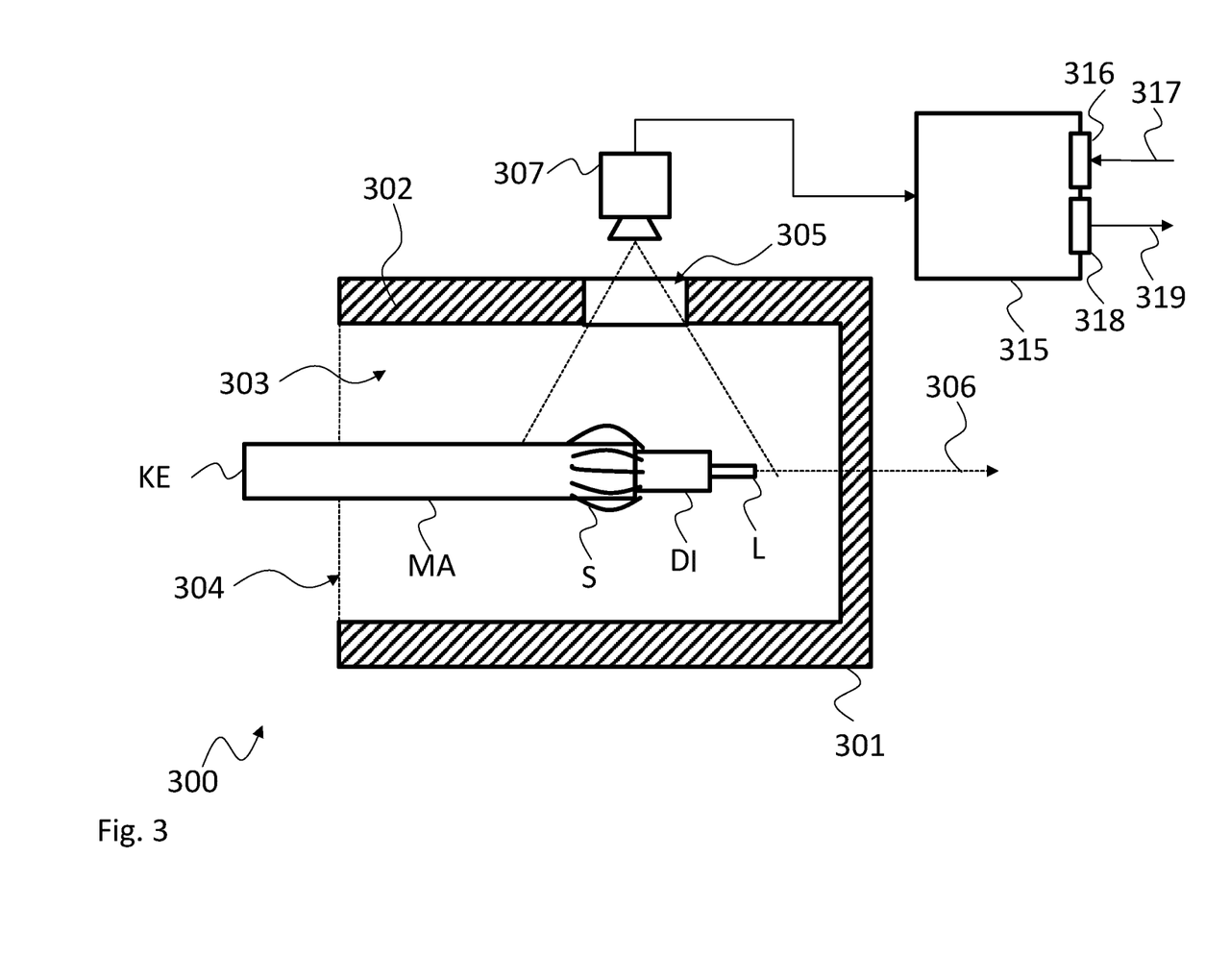
FIG. 3 is a sectional view of a schematic illustration of a further embodiment of a capturing device according to the present invention.

FIG. 3 is a sectional view of a further capturing device 300. The capturing device 300 is based on the capturing device 100, so it likewise has a radiation source 301 in which a wall 302 encloses a recording chamber 303. An insertion opening 304 and an image-recording opening 305 are provided in the wall 202, and an image-capturing apparatus 307 is arranged at the image-recording opening 305. The above explanations in relation to the capturing device 100 also apply analogously to the capturing device 300. In addition, the features discussed below in relation to the capturing device 300 may also be combined with the capturing device 100 and/or the capturing device 200.

In accordance with an embodiment of the present invention, the capturing device 300 develops the capturing device 100 in that an analysis apparatus 315 is provided, which is coupled to the image-capturing apparatus 307.

From the image-capturing apparatus 307, the analysis apparatus 315 receives at least one image of the cable end KE and, on the basis of the received image, checks whether the cable end KE has processing faults or foreign matter in one or more predefined regions.

For this purpose, the analysis apparatus 315 in one embodiment may receive one image from the recording chamber 303 without the cable end KE being located in the recording chamber 303, and receive one image when the cable end KE is located in the recording chamber 303. The analysis apparatus 315 can compute a difference image from the two images and, on the basis of the difference image, check whether the cable end KE has any foreign matter. By computing the difference image, any non-homogeneities of the background can be excluded from the analysis.

To check for processing faults, the analysis apparatus 315 may add up grayscale values of the pixels for the corresponding region and detect a processing fault if the sum is outside of a predefined value range.

The analysis apparatus 315 may output the result of the check in the form of a check signal 319 via an output interface 318. The check signal 319 may be configured as a dedicated signal that can characterize a positive or negative result of the check, e.g., High/Low, 0/1, Yes/No. Alternatively, the output interface 318 may be formed as a digital communication interface. In this kind of embodiment, the check signal 319 can be configured as a digital data signal which, in addition to the result of the check, may include further information, for example even the recorded images of the cable end KE.

The analysis apparatus 315 may also have a trigger interface 316. Via the trigger interface 316, the analysis apparatus 315 can receive a trigger signal 317. When it receives the trigger signal 317, the analysis apparatus 315 can actuate the image-capturing apparatus 307 to record the images of the cable end KE.

The trigger signal 317 can originate, for example, from a so-called programmable logic controller (PLC) or be dynamically generated by, for example, sensors, in particular photoelectric sensors, when a cable end KE is inserted into the recording chamber 303.

Figure 4:
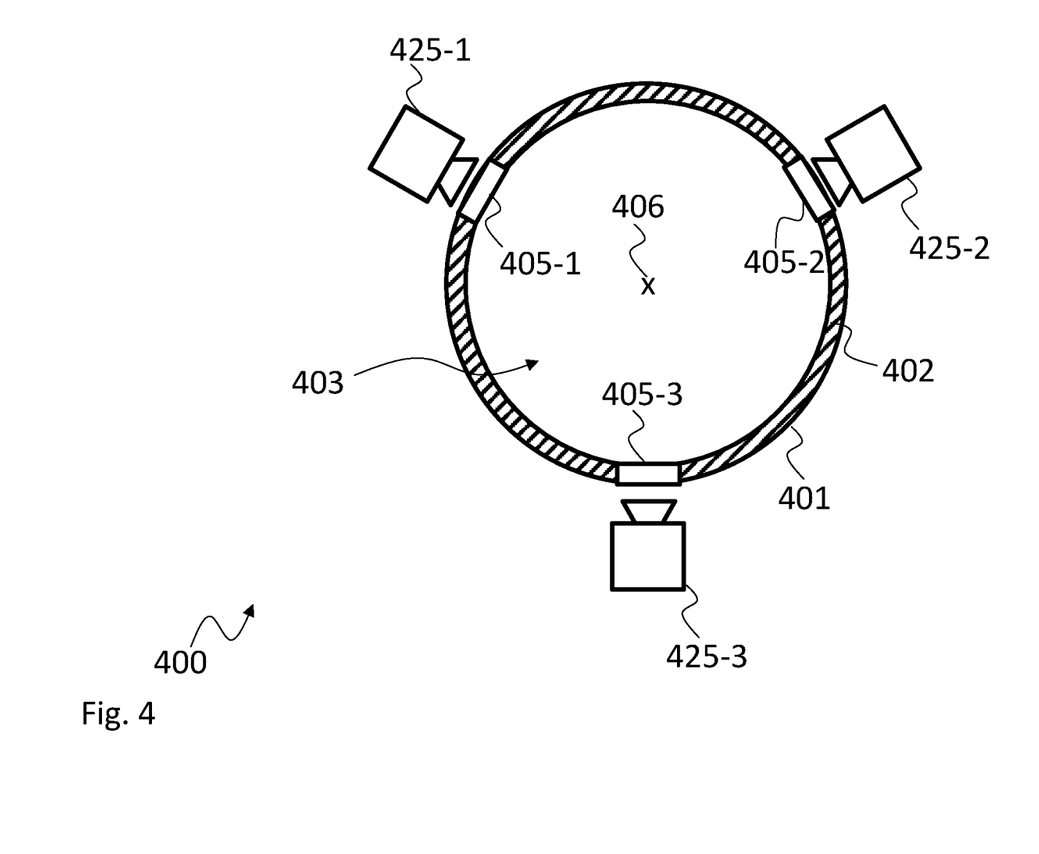
FIG. 4 is a sectional view of a schematic illustration of a further embodiment of a capturing device according to the present invention.

FIG. 4 is a sectional view of a further capturing device 400, perpendicularly to the longitudinal axis 406 of the radiation source 401, the sectional plane being located at the image-recording openings 405-1, 405-2, 405-3 of the radiation source 401. The capturing device 400 is based on the capturing device 100, so it likewise has a radiation source 401 in which a wall 402 encloses a recording chamber 403. The features discussed below in relation to the capturing device 400 may also be combined with the capturing device 100 and/or the capturing device 200 and/or the capturing apparatus 300.

In accordance with an embodiment of the present invention, the capturing device 400 develops the capturing device 100 in that three image-recording openings 405-1, 405-2, 405-3 are provided in the wall 402. The image-recording openings 405-1, 405-2, 405-3 are arranged around the longitudinal axis 406, each at an angle of 120° to one another, and a corresponding image recorder in the form of a camera 425-1, 425-2, 425-3 is provided for each of the image-recording openings 405-1, 405-2, 405-3.

The arrangement of the capturing device 400 makes it possible to capture and analyze an object to be checked, in particular a cable end, from three different directions simultaneously. In the process, the segments recorded by the three images overlap each other at the side edges. For these regions, therefore, the object to be checked can be checked in a redundant manner and the quality of the review can be increased.

Figure 5:
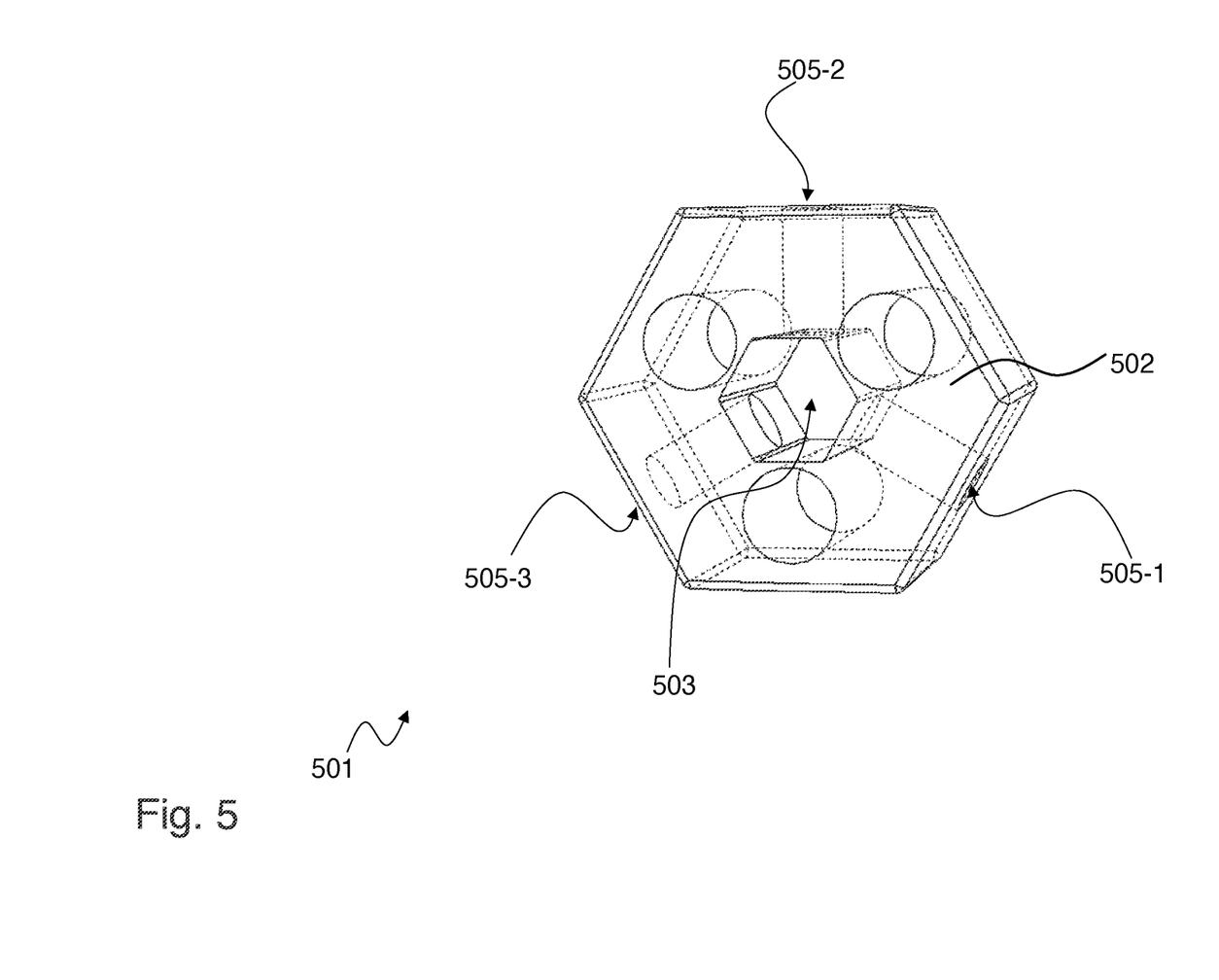
FIG. 5 is a perspective view of an embodiment of a radiation source according to the present invention.

FIG. 5 is a perspective view of a radiation source 501 according to an embodiment of the present invention. The radiation source 501 is formed as a solid metal body that has a hexagonal cross section in plan view.

The recording chamber 503 is formed by a duct that is arranged at the center point of the hexagonal cross section and likewise has a hexagonal cross section. The sides of the recording chamber 503 are aligned with the external sides of the radiation source 501, and the longitudinal axis of the recording chamber 503 is perpendicular to the hexagonal cross sections. In the radiation source 501, the thickness of the metal body roughly matches the difference between the circumradius of the hexagonal cross section of the metal body and the circumradius of the hexagonal cross section of the recording chamber 503. The wall 502 around the recording chamber 503 is solid in this configuration.

The radiation source 501 has three image-recording openings 505-1, 505-2, 505-3, which are formed as radial bores and are each located centrally in one of the segments of the hexagonal cross section, one segment without a bore being located in each case between two segments having a bore. In the segments that do not have a radial bore, axial bores are arranged in parallel with the longitudinal axis 506. The mass of the radiation source 501 can be reduced as a result of said bores, thereby reducing the energy required to heat the radiation source 501. In addition, for example, the aforementioned heating elements may be introduced into said bores.

The radiation source 501 can be milled out of, for example, an appropriate solid material, so it is very simple to produce.

The radiation source according to other embodiments of the present invention may also have a cross section that differs from a hexagonal shape. For example, a round or square cross section may alternatively be selected.

Figure 6:
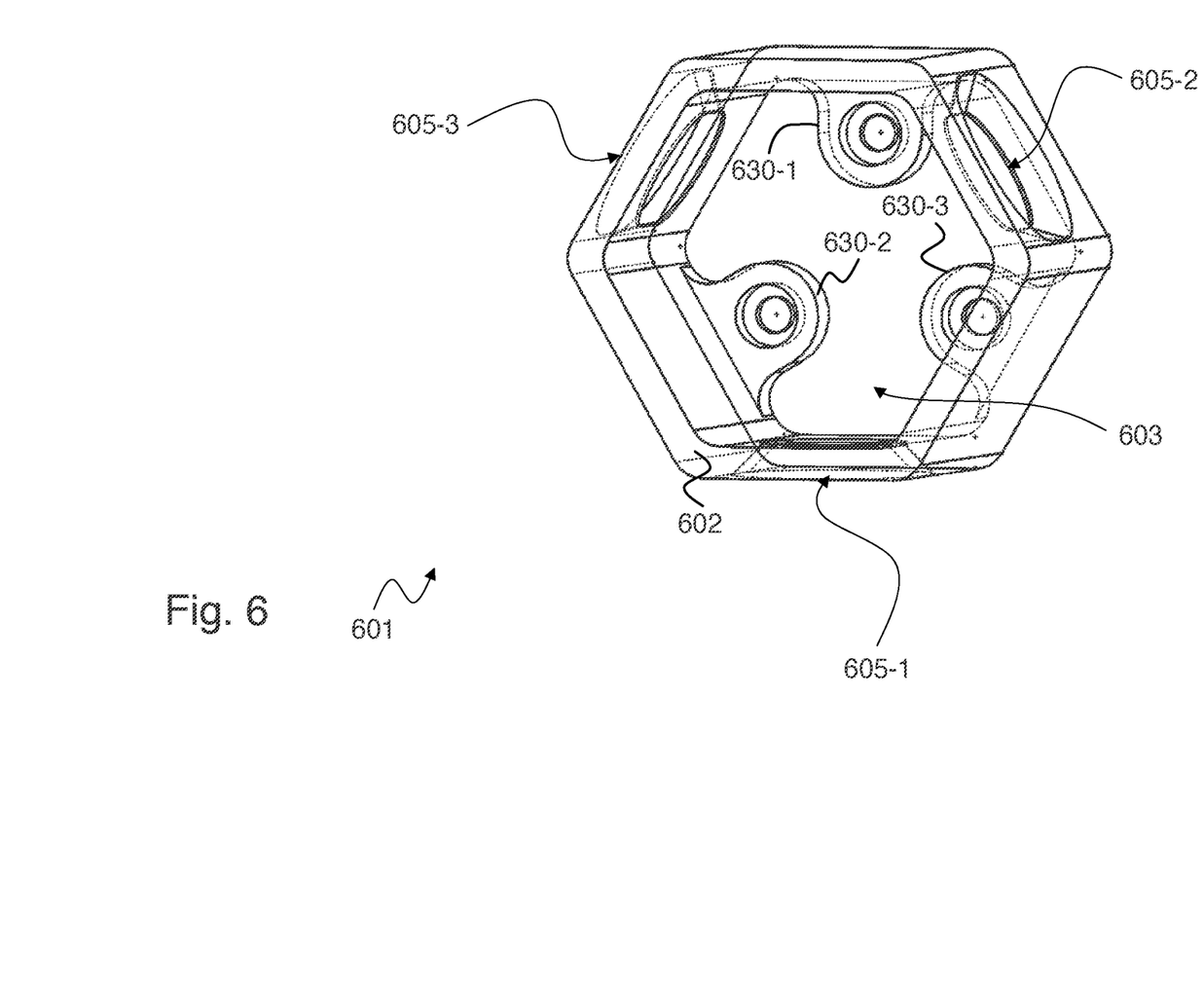
FIG. 6 is a perspective view of a further embodiment of a radiation source according to the present invention.

FIG. 6 is a perspective view of a further radiation source 601. In plan view, the radiation source 601 likewise has a hexagonal cross section and is constructed substantially analogously to the radiation source 501.

However, unlike the radiation source 501, the radiation source 601 has a recording chamber 603 having a significantly larger diameter since the walls of the wall 602 are much thinner in the radiation source 601 than in the radiation source 501. With the radiation source 601, larger objects to be checked can thus be inserted into the recording chamber 603 and illuminated.

At a back end of the recording chamber 603 in FIG. 6, three fastening elements 630-1, 630-2, 630-3 are arranged so as to project into the recording chamber 603 perpendicularly from the wall 602. These fastening elements 630-1, 630-2, 630-3 are configured as lugs, each of which has a bore for fastening the radiation source 601. It goes without saying that in further embodiments the fastening elements 630-1, 630-2, 630-3 may also be arranged on the outside of the radiation source 601.

The image-recording openings 605-1, 605-2, 605-3 in the wall 602 each have a cross section that tapers conically into the recording chamber 603. This cross section may be used as a mechanical receptacle or as a mechanical bearing for cameras that are to be mounted. These cameras may each have a counterpiece that corresponds to the respective image-recording openings 605-1, 605-2, 605-3 and engages in the relevant image-recording opening 605-1, 605-2, 605-3 in a form-fitting manner. The cameras may thus be positioned precisely in a very simple manner.

For the sake of clarity, the reference signs from the device-based FIGS. 1 to 6 will be retained in the following description of the method-based FIG. 7.

Figure 7:
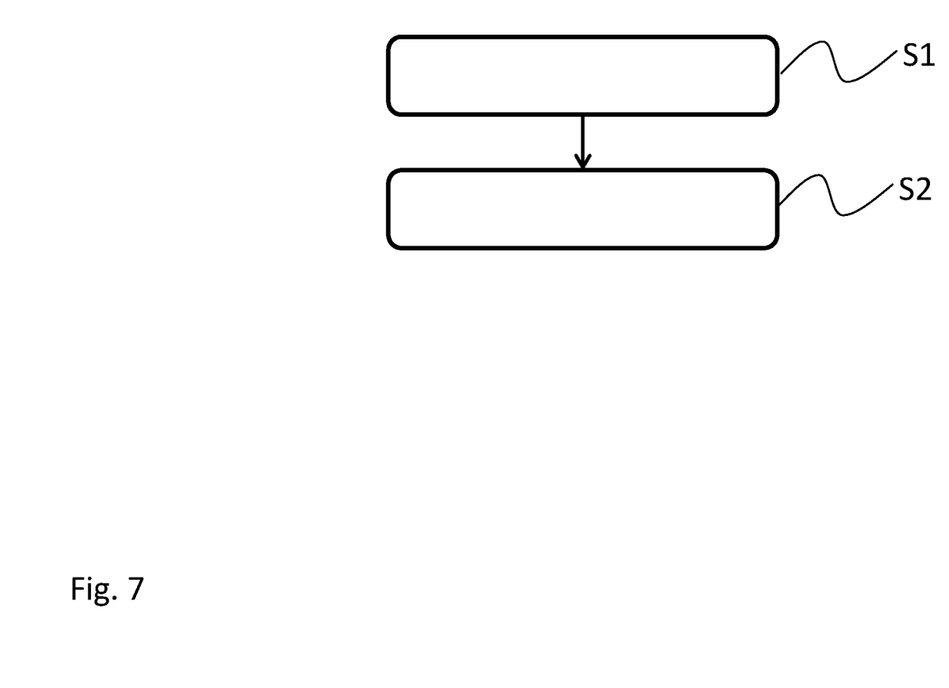
FIG. 7 is a flow diagram of an embodiment of a method according to the present invention.

FIG. 7 is a flow diagram of an embodiment of a method according to an embodiment of the present invention for optically capturing an object KE to be checked, in particular a stripped cable end KE of a cable.

The method comprises inserting S1 the object KE to be checked into a heated radiation source 101, 201, 301, 401, 501, 601 having a wall 102, 202, 302, 402, 502, 602 which encompasses a recording chamber 103, 203, 303, the radiation source 101, 201, 301, 401, 501, 601 being configured to emit at least infrared radiation IR when in a heated state, the wall 102, 202, 302, 402, 502, 602 having at least one insertion opening 104, 204, 304, 504 for inserting the object KE to be checked into the recording chamber 103, 203, 303 and at least one image-recording opening 105, 205, 305, 405-1, 405-2, 405-3, 505-1, 505-2, 505-3, 605-1, 605-2, 605-3 for recording images of the object KE to be checked. The method further comprises recording S2 images of the object KE to be checked through the at least one image-recording opening 105, 205, 305, 405-1, 405-2, 405-3, 505-1, 505-2, 505-3, 605-1, 605-2, 605-3.

In one embodiment, the object KE to be checked can be inserted into the recording chamber 103, 203, 303 through the insertion opening 104, 204, 304, 504, which is arranged on a surface of the radiation source 101, 201, 301, 401, 501, 601 that is at a predefined angle, in particular a 90° angle, to the longitudinal axis 106, 306 of the recording chamber 103, 203, 303, which in particular may have a cylindrical or U-shaped lateral cross section. The object KE to be checked is thus inserted into the recording chamber 103, 203, 303 either on or in parallel with the longitudinal axis 106, 306 thereof. The images can be recorded through at least one image-recording opening 105, 205, 305, 405-1, 405-2, 405-3, 505-1, 505-2, 505-3, 605-1, 605-2, 605-3 arranged radially on the recording chamber 103, 203, 303.

To excite the radiation source 101, 201, 301, 401, 501, 601 to emit infrared radiation IR, the method may comprise heating the radiation source 101, 201, 301, 401, 501, 601 using at least one heating element 210-1, 210-2, 210-3. A heating element 210-1, 210-2, 210-3 of this kind may be thermally coupled to the radiation source 101, 201, 301, 401, 501, 601 and may have in particular a thermistor. Alternatively, the heating element 210-1, 210-2, 210-3 may heat the radiation source 101, 201, 301, 401, 501, 601 contactlessly, in particular inductively.

When recording S2 images, in one embodiment three images can be recorded through three image-recording openings 105, 205, 305, 405-1, 405-2, 405-3, 505-1, 505-2, 505-3, 605-1, 605-2, 605-3 arranged in the wall 102, 202, 302, 402, 502, 602. In this case, the image-recording openings 105, 205, 305, 405-1, 405-2, 405-3, 505-1, 505-2, 505-3, 605-1, 605-2, 605-3 may be arranged radially in the wall 102, 202, 302, 402, 502, 602, each at an angle of 120° to one another.

The method may further comprise recognizing, on the basis of the recorded images, processing faults in at least one predefined region of the object KE to be checked.

To recognize the processing faults, in particular at least one image can be recorded without the object KE to be checked being located in the recording chamber 103, 203, 303. Additionally, at least one image may be recorded when the object KE to be checked is located in the recording chamber 103, 203, 303. Next, a difference image can be computed from the received images and, on the basis of the difference image, a check can be carried out as to whether the object KE to be checked has any foreign matter.

To recognize processing errors in the at least one predefined region, for example, grayscale values of the pixels for the at least one predefined region can be added together and foreign matter may be detected if the sum is outside of a predefined value range.

Since the devices and methods described in detail above are embodiment examples, a person skilled in the art may extensively modify them in the usual way without departing from the scope of the invention. In particular, the mechanical arrangements and relative proportions of the individual elements are merely exemplary.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 200, 300, 400 Capturing device
101, 201, 301, 401, 501, 601 Radiation source
102, 202, 302, 402, 502, 602 Wall
103, 203, 303 Recording chamber
104, 204, 304, 504 Insertion opening
105, 205, 305, 405-1, 405-2, 405-3 Image-recording opening
505-1, 505-2, 505-3 Image-recording opening
605-1, 605-2, 605-3 Image-recording opening
106, 306 Longitudinal axis
107, 207, 307 Image-capturing apparatus
210-1, 210-2, 210-3 Heating element
211 Energy source
315 Analysis apparatus
316 Trigger interface
317 Trigger signal
318 Output interface
319 Check signal
425-1, 425-2, 425-3 Camera
530-1, 530-2, 530-3 Openings
630-1, 630-2, 630-3 Fastening element
IR Infrared radiation
KE Cable end
MA Sheath
DI Dielectric
L Conductor
S Shield wire
S1, S2 Method steps

What is claimed is:

1. A capturing device for optically capturing a cable end, the capturing device comprising:
a radiation source having a wall which encompasses a recording chamber with a longitudinal center axis, wherein the radiation source is configured to emit at least infrared radiation when in a heated state, wherein the wall has at least one insertion opening for inserting the cable end into the recording chamber and at least one image-recording opening for recording images of the cable end, the at least one image-recording opening being arranged radially on the wall which encompasses the recording chamber; and an image-capturing apparatus configured to record infrared images of the cable end through the at least one image-recording opening such that the images capture an entire circumferential periphery of the cable end, the image-capturing apparatus having an imaging axis along which the images of the cable end are received, the imaging axis being orthogonal to the longitudinal center axis of the recording chamber.

2. The capturing device according to claim 1, wherein the recording chamber has a lateral cross section that is substantially cylindrical or U-shaped along a longitudinal axis.

3. The capturing device according to claim 1, wherein:
the insertion opening is arranged on a surface of the radiation source that is at a 90° angle to the longitudinal axis; and/or
the at least one image-recording opening is arranged radially on the recording chamber.

4. The capturing device according to claim 1, further comprising at least one heating element which is thermally coupled to the radiation source and configured to heat the radiation source to a predefined temperature, and wherein the heating element has a thermistor.

5. The capturing device according to claim 1, wherein the wall has three image-recording openings arranged radially in the wall, each at an angle of 120° to one another.

6. The capturing device according to claim 5, wherein the image-capturing apparatus has three image recorders, which are arranged at respective ones of the image-recording openings, each at an angle of 120° to one another, wherein image axes of the image recorders are each directed into the recording chamber through the respective image-recording opening toward the longitudinal axis of the recording chamber.

7. The capturing device according to claim 1, further comprising an analysis apparatus which is coupled to the image-capturing apparatus and configured to receive, from the image-capturing apparatus, in each case at least one image of the object to be checked, and to check whether the object to be checked has any foreign matter in at least one predefined region.

8. The capturing device according to claim 7, wherein the analysis apparatus has a trigger interface for receiving a trigger signal and is configured, upon receiving the trigger signal, to actuate the image-capturing apparatus to record the at least one image.

9. The capturing device according to claim 1, wherein the analysis apparatus is configured to receive a first image from the image-capturing apparatus without the object to be checked being located in the recording chamber, and to receive a second image with the object to be checked being located in the recording chamber, and wherein the analysis apparatus is further configured to compute a difference image from the first and second images and to check, on the basis of the difference image, whether the object to be checked has any foreign matter.

10. The capturing device according to claim 7, wherein, in order to check the at least one predefined region, the analysis apparatus is configured to add up grayscale values of the pixels for the predefined region to obtain a sum, and to detect foreign matter based on the sum being outside of a predefined value range.

11. The capturing device according to claim 1, wherein the object to be checked is a stripped cable end of a cable.

12. A method for optically capturing cable end, the method comprising:

inserting the cable end into a heated radiation source having a wall which encompasses a recording chamber with a longitudinal center axis, wherein the radiation source is configured to emit at least infrared radiation when in a heated state, wherein the wall has at least one insertion opening for inserting the cable end into the recording chamber and at least one image-recording opening for recording images of the cable end, the at least one image-recording opening being arranged radially on the wall which encompasses the recording chamber; and recording infrared images of the cable end with at least one image-capturing apparatus through the at least one image-recording opening such that the images capture an entire circumferential periphery of the cable end, the image-capturing apparatus having an imaging axis along which the images of the cable end are received, the imaging axis being orthogonal to the longitudinal center axis of the recording chamber.

13. The method according to claim 12, wherein:
the object to be checked is inserted into the recording chamber through the insertion opening, which is arranged on a surface of the radiation source that is at a a 90° angle to the longitudinal axis of the recording chamber, which has a cylindrical or U-shaped lateral cross section; and/or
the images are recorded through the at least one image-recording opening arranged radially on the recording chamber.

14. The method according to claim 12, further comprising heating the radiation source to a predefined temperature using at least one heating element, which is thermally coupled to the radiation source and has a thermistor.

15. The method according to claim 12, wherein three respective images are recorded through three image-recording openings arranged radially in the wall, wherein the image-recording openings at an angle of 120° to one another.

16. The method according to claim 12, further comprising recognizing, based on the recorded images, foreign matter in at least one predefined region of the object to be checked, wherein, to recognize the foreign matter
a first image is recorded without the object to be checked being located in the recording chamber, and a second image is recorded with the object to be checked being located in the recording chamber, and a difference image is computed from the received images, and, based on the difference image, a check is carried out whether the object to be checked has the foreign matter; and/or
grayscale values of the pixels for the at least one predefined region are added together to obtain a sum, and the foreign matter is detected based on the sum being outside of a predefined value range.

17. The method according to claim 12, wherein the object to be checked is a stripped cable end of a cable.

18. The capturing device according to claim 1, wherein the wall of the heated radiation source includes a plurality of image-recording openings evenly distributed about a circumference of the wall, and wherein the image-capturing apparatus is configured to record images of the cable end through each of the plurality of image-recording openings.

19. The method according to claim 12, further comprising rotating the cable end within the recording chamber such that the recorded images capture different circumferential portions of the cable end.

20. The method according to claim 12, further comprising compiling the recorded images of the cable end into a single image, wherein the recorded images are two-dimensional images.

* * * * *